US009568688B2

(12) United States Patent
Sasaoka (10) Patent No.: US 9,568,688 B2
(45) Date of Patent: Feb. 14, 2017

(54) MULTI-CORE OPTICAL FIBER INTERCONNECTION STRUCTURE AND METHOD FOR MANUFACTURING MULTI-CORE OPTICAL FIBER INTERCONNECTION STRUCTURE

(71) Applicant: SUMITOMO ELECTRIC INDUSTRIES, LTD., Osaka-shi, Osaka (JP)

(72) Inventor: Eisuke Sasaoka, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 214 days.

(21) Appl. No.: 13/693,211

(22) Filed: Dec. 4, 2012

(65) Prior Publication Data
US 2013/0142487 A1 Jun. 6, 2013

Related U.S. Application Data

(60) Provisional application No. 61/682,411, filed on Aug. 13, 2012.

(30) Foreign Application Priority Data

Dec. 5, 2011 (JP) .................. 2011-265637

(51) Int. Cl.
*G02B 6/38* (2006.01)
*G02B 6/36* (2006.01)
*G02B 6/42* (2006.01)

(52) U.S. Cl.
CPC .......... *G02B 6/3885* (2013.01); *G02B 6/3652* (2013.01); *G02B 6/3822* (2013.01); *G02B 6/4224* (2013.01); *Y10T 29/49826* (2015.01)

(58) Field of Classification Search
CPC ............ G02B 6/24; G02B 6/25; G02B 6/255; G02B 6/2551; G02B 6/2555; G02B 6/3885; G02B 6/3652; G02B 6/3822; G02B 6/4224; Y10T 29/49826
See application file for complete search history.

(56) References Cited

U.S. PATENT DOCUMENTS 5,825,955 A * 10/1998 Ernst et al. ............... 385/79
6,520,689 B2 * 2/2003 DeMartino et al. ........ 385/98

FOREIGN PATENT DOCUMENTS

JP      H5-119223      5/1993
JP      H11-337761    12/1999
(Continued)

OTHER PUBLICATIONS

English machine translation of JP 2010-286548A.*
(Continued)

*Primary Examiner* — John M Bedtelyon
(74) *Attorney, Agent, or Firm* — Drinker Biddle & Reath LLP (57) ABSTRACT

A multi-core optical fiber interconnection structure has a first multi-core optical fiber with a slanted end face and a second multi-core optical fiber with a slanted end face. In a state in which the slanted end faces face each other, each of cores of the first multi-core optical fiber is optically coupled to a corresponding one of cores of the second multi-core optical fiber in a one-to-one correspondence relation. The facing condition between the slanted end faces is adjusted so as to minimize variation in core pitches of pairs of the cores each in the one-to-one correspondence relation.

15 Claims, 5 Drawing Sheets

(56) References Cited

FOREIGN PATENT DOCUMENTS

| JP | 2010-286548 | 12/2010 |
| JP | 2011-170099 | 9/2011 |
| WO | WO 02/071102 | 9/2002 |

OTHER PUBLICATIONS

English-language translation of International Preliminary Report on Patentability (IPRP) dated Jun. 19, 2014 that issued in WO Patent Application No. PCT/JP2012/079537.
Takaya M. et al., "Design and Performance of Very High-Density Multifiber Connectors Employing Monolithic 60-Fiber Ferrules", IEEE Photonics Technology Letters, IEEE Service Center, vol. 11, No. 11, Nov. 1, 1999, p. 1446-p. 1448, XP000893786.

* cited by examiner

MULTI-CORE OPTICAL FIBER INTERCONNECTION STRUCTURE AND METHOD FOR MANUFACTURING MULTI-CORE OPTICAL FIBER INTERCONNECTION STRUCTURE

This application claims the benefit of U.S. Provisional Application No. 61/682,411 filed Aug. 13, 2012, which is incorporated by reference herein in the entirety.

BACKGROUND OF THE INVENTION

Field of the Invention

The present invention relates to a multi-core optical fiber interconnection structure and a method for manufacturing the multi-core optical fiber interconnection structure.

Related Background of the Invention

PC (Physical Contact) coupling is known as a method for optically connecting end faces of ordinary single-core optical fibers. In order to reduce reflection at an interconnection by PC coupling, it is necessary to keep an end face of a core of one single-core optical fiber in contact with an end face of a core of the other single-core optical fiber. Since each single-core optical fiber has only one core at the center in the end face, the end faces are polished in convex shape so as to form tops in central regions of the end faces of the respective optical fibers, and the end faces of the respective optical fibers are brought into contact as opposed to each other.

SUMMARY OF THE INVENTION

The inventor conducted research on the conventional technology and found the problem as described below. Namely, in the case of multi-core optical fibers having a plurality of cores extending along the central axis, in a common cladding, the cores are also located at positions except for the center in the end face and it is thus difficult to apply the aforementioned PC coupling to each of the cores. There was no conventional technology taking account of reflection at the interconnection in optical connection between multi-core optical fibers.

The present invention has been accomplished in order to solve the problem as discussed above, and it is an object of the present invention to provide a multi-core optical fiber interconnection structure capable of reducing reflection at an interconnection where respective end faces of first and second multi-core optical fibers are connected to each other.

A multi-core optical fiber interconnection structure according to the present invention, as a first aspect, comprises a first multi-core optical fiber having a plurality of cores extending along a first central axis of the first fiber, in a common cladding, and a second multi-core optical fiber having a plurality of cores extending along a second central axis of the second fiber, in a common cladding. The core arrangement and core pitch of the first multi-core optical fiber on a plane normal to the first central axis are substantially identical with those of the second multi-core optical fiber on a plane normal to the second central axis.

In the first aspect, at least one end face of the first multi-core optical fiber is slanted with respect to the plane normal to the first central axis. At least one end face of the second multi-core optical fiber is slanted with respect to the plane normal to the second central axis. Particularly, in the first aspect, the first and second multi-core optical fibers are arranged so that the slanted end faces of the first and second multi-core optical fibers face each other in a state in which the first central axis and the second central axis are maintained substantially parallel to each other. Each of the cores of the first multi-core optical fiber is optically coupled to a corresponding one of the cores of the second multi-core optical fiber in a one-to-one correspondence relation.

As a second aspect applicable to the first aspect, the slanted end face of the first multi-core optical fiber and the slanted end face of the second multi-core optical fiber preferably face each other so as to minimize variation in inter-core connection losses of pairs of the cores each in the one-to-one correspondence relation.

As a third aspect applicable to at least any one of the first and second aspects, the slanted end face of the first multi-core optical fiber and the slanted end face of the second multi-core optical fiber preferably face each other so as to minimize variation in distance between pairs of the cores each in the one-to-one correspondence relation.

Furthermore, as a fourth aspect applicable to at least any one of the first to third aspects, the slanted end face of the first multi-core optical fiber is preferably slanted in the range of 5° to 11° relative to the plane normal to the first central axis. Likewise, the slanted end face of the second multi-core optical fiber is also preferably slanted in the range of 5° to 11° relative to the plane normal to the second central axis.

As a fifth aspect applicable to at least any one of the first to fourth aspects, the first multi-core optical fiber preferably has a first marker for specifying positions of the respective cores in the core arrangement on the plane normal to the first central axis. Likewise, the second multi-core optical fiber also preferably has a second maker for specifying positions of the respective cores in the core arrangement on the plane normal to the second central axis. Particularly, the first marker in the slanted end face of the first multi-core optical fiber is located in an end face region lying farther away from the other end face of the first multi-core optical fiber than a first reference plane including an intersection between the slanted end face of the first multi-core optical fiber and the first central axis and being normal to the first central axis. On the other hand, the second marker in the slanted end face of the second multi-core optical fiber is located in an end face region lying nearer to the other end face of the second multi-core optical fiber than a second reference plane including an intersection between the slanted end face of the second multi-core optical fiber and the second central axis and being normal to the second central axis. In this case, the slanted end faces of the first and second multi-core optical fibers are made to face each other so as to align the first marker and the second marker with each other, whereby the variation in core pitches of the pairs of the cores each in the one-to-one correspondence relation can be easily minimized.

As a sixth aspect applicable to at least any one of the first to fifth aspects, the multi-core optical fiber interconnection structure may further comprise a first ferrule, a second ferrule, and a sleeve. The first ferrule is fixed to one end of the first multi-core optical fiber in a state in which the one end of the first multi-core optical fiber including the slanted end face is inserted therein. The second ferrule is fixed to one end of the second multi-core optical fiber in a state in which the one end of the second multi-core optical fiber including the slanted end face is inserted therein. The sleeve functions to implement positioning of the first ferrule and the second ferrule.

As a seventh aspect applicable to at least any one of the first to sixth aspects, the multi-core optical fiber interconnection structure may further comprise a groove member for positioning of the first multi-core optical fiber and the second multi-core optical fiber.

As an eighth aspect applicable to at least any one of the first to seventh aspects, an optical return loss of light on the slanted end face of the first multi-core optical fiber is preferably not less than 30 dB. Likewise, an optical return loss of light on the slanted end face of the second multi-core optical fiber is also preferably not less than 30 dB. The optical return loss (ORL: Optical Return Loss) is defined as below by a ratio of power of light returning from an optical component to a light source (power of back reflection) to power of light incident into the optical component (power of incident light).

ORL=−10·Log (back reflection power/incident light power)

Therefore, an increase of optical return loss means a decrease of light quantity of back reflection.

As a ninth aspect applicable to at least any one of the first to eighth aspects, variation in distance between the cores of the first multi-core optical fiber and the cores of the second multi-core optical fiber in the one-to-one correspondence relation are preferably not more than 1.6 µm. As a tenth aspect applicable to at least any one of the first to ninth aspects, connection losses between the cores of the first multi-core optical fiber and the cores of the second multi-core optical fiber in the one-to-one correspondence relation are preferably not more than 0.4 dB. Furthermore, as an eleventh aspect applicable to at least any one of the first to tenth aspects, at least a portion of the slanted end face of the first multi-core optical fiber is preferably in contact with the slanted end face of the second multi-core optical fiber.

As a twelfth aspect, a method for manufacturing a multi-core optical fiber interconnection structure according to the present invention is to manufacture the multi-core optical fiber interconnection structure according to at least any one of the first to eleventh aspects. Specifically, the first multi-core optical fiber has the plurality of cores extending along the first central axis, in the common cladding and at least one end face thereof is slanted relative to the plane normal to the first central axis. The second multi-core optical fiber has the plurality of cores extending along the second central axis, in the common cladding and at least one end face thereof is slanted relative to the plane normal to the second central axis.

The manufacturing method according to the twelfth aspect comprises: arranging the first and second multi-core optical fibers so that the slanted end face of the first multi-core optical fiber and the slanted end face of the second multi-core optical fiber face each other in a state in which the first central axis and the second central axis are substantially parallel to each other. Furthermore, the manufacturing method comprises: adjusting relative positions between the slanted end faces of the first and second multi-core optical fibers so as to minimize variation in inter-core connection losses of pairs of the cores each in the one-to-one correspondence relation, in a state in which the cores of the first multi-core optical fiber and the cores of the second multi-core optical fiber are kept each in the one-to-one correspondence relation.

As a thirteenth aspect applicable to the twelfth aspect, at least a portion of the slanted end face of the first multi-core optical fiber is preferably in contact with the slanted end face of the second multi-core optical fiber.

DESCRIPTION OF THE PREFERRED EMBODIMENTS

Embodiments of the present invention will be described below in detail with reference to the accompanying drawings. The same elements will be denoted by the same reference signs in the description of the drawings, without redundant description.

First Embodiment

Figure 1A:
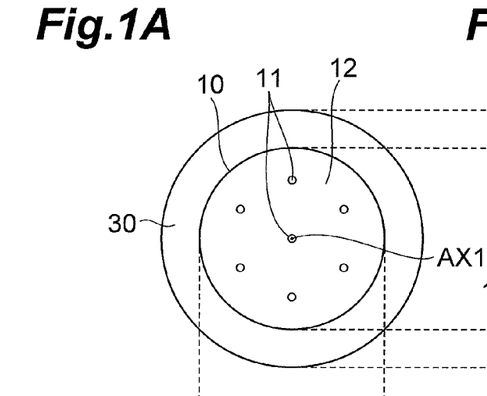
FIGS. 1A to 1C are drawings showing a configuration of one multi-core optical fiber (first multi-core optical fiber) applicable to a multi-core optical fiber interconnection structure according to the first embodiment.
Figure 1B:
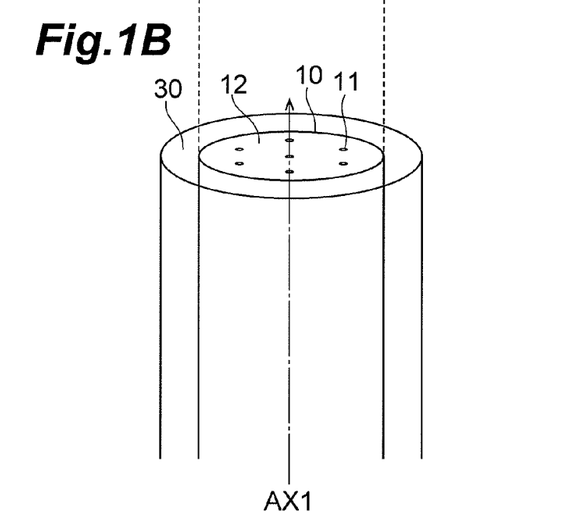
Figure 1C:
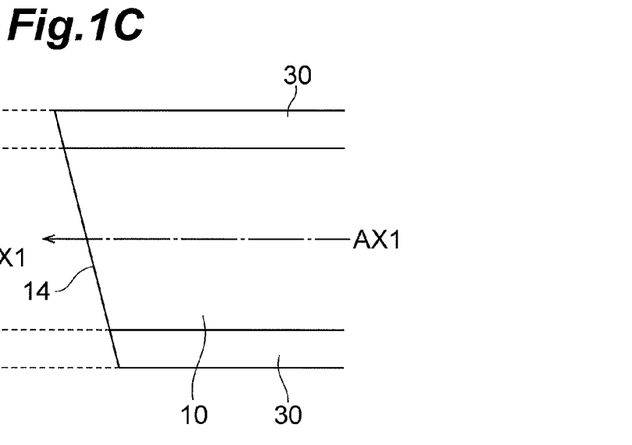

FIGS. 1A to 1C are drawings showing a configuration of one multi-core optical fiber (first multi-core optical fiber) 10 which can be applied to a multi-core optical fiber interconnection structure 1 according to the first embodiment. FIG. 1A is a view of the multi-core optical fiber 10 from a direction along a central axis AX1. FIG. 1B and FIG. 1C are views of the multi-core optical fiber 10 from two directions normal to the direction along the central axis AX1 and perpendicular to each other.

The multi-core optical fiber 10 has a plurality of cores 11 extending along the central axis AX1, in a common cladding 12. Each core 11 has the refractive index higher than that of the cladding 12 and can guide light. In the example shown in FIGS. 1A to 1C, one core 11 exists at the center in a circular section normal to the central axis AX1 of the multi-core optical fiber 10, and six cores 11 exist at equal intervals on the circumference of a circle centered at the central core 11. Namely, the seven cores 11 are arranged at respective grid points of a triangle grid.

At an end of the multi-core optical fiber 10 including an end face 14, a ferrule 30 is fixed in a state in which the end is inserted therein. The end face 14 of the multi-core optical fiber 10 and an end face of the ferrule 30 are present on a common plane and are slanted relative to a plane normal to the central axis AX1. An angle of the slant is, for example, 8°.

The multi-core optical fiber 10 and ferrule 30 as described are manufactured as described below. A coating layer is removed in a fixed range on the one end side of the multi-core optical fiber 10 to expose the cladding 12. Then this end where the cladding 12 is exposed is inserted into the ferrule 30. An adhesive is poured into the ferrule 30 in a state in which one end of the multi-core optical fiber 10 projects slightly from the ferrule 30, whereby they are fixed to each other. Then the end faces of the multi-core optical fiber 10 and ferrule 30 are polished to form the end face 14 slanted relative to the plane normal to the central axis AX1.

Figure 2A:
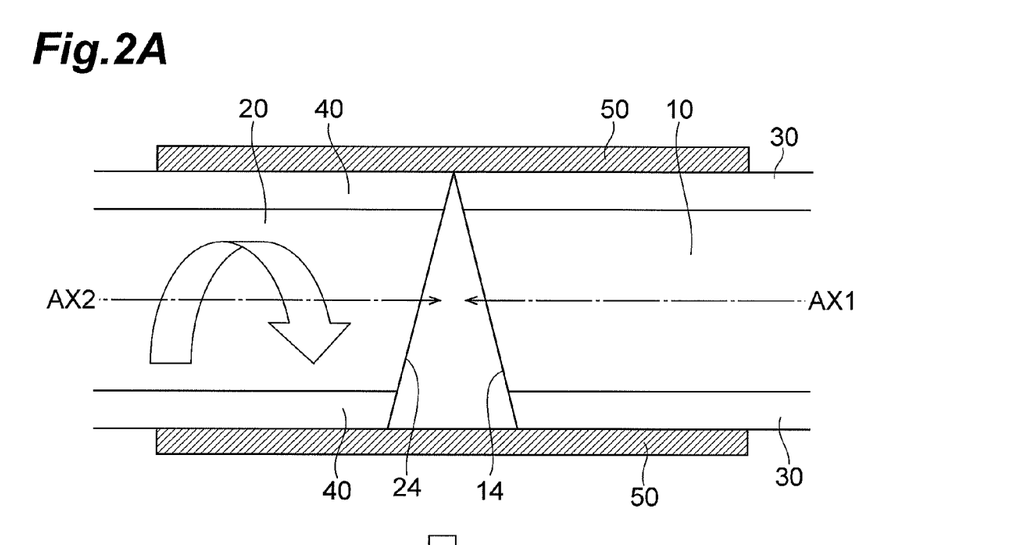
FIGS. 2A and 2B are drawings showing a configuration of the multi-core optical fiber interconnection structure according to the first embodiment.
Figure 2B:
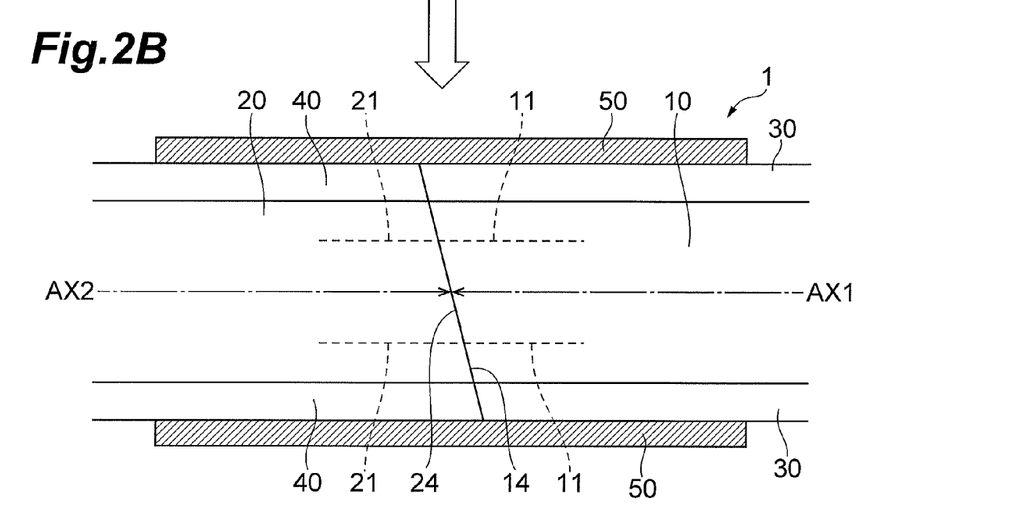

FIGS. 2A and 2B are drawings showing a configuration of the multi-core optical fiber interconnection structure 1 according to the first embodiment. The multi-core optical fiber interconnection structure 1 is provided with the above-described multi-core optical fiber (first multi-core optical fiber) 10 and ferrule 30 and further provided with a multi-core optical fiber (second multi-core optical fiber) 20 and ferrule 40 having the same configuration as those, and with a sleeve 50. The inner diameter of the sleeve 50 is slightly larger than the outer diameter of the ferrules 30, 40.

The multi-core optical fiber 10 and ferrule 30 are inserted into the sleeve 50 on the side of the slanted end face 14. The multi-core optical fiber 20 and ferrule 40 are inserted into the sleeve 50 on the side of the slanted end face 24. In the sleeve 50, the multi-core optical fiber 10 and the multi-core optical fiber 20 are arranged so that the respective central axes AX1, AX2 are parallel to each other and so that the respective end faces 14, 24 face each other. Each of the cores 11 of the multi-core optical fiber 10 is optically coupled to a corresponding one of cores 21 of the multi-core optical fiber 20 in a one-to-one correspondence relation.

The multi-core optical fiber interconnection structure 1 having the structure as described above is manufactured as described below. Specifically, as shown in FIG. 2A, the end of the multi-core optical fiber 10 including the slanted end face 14 is inserted together with the ferrule 30 fixed to the end, into the sleeve 50 from one opening end of the sleeve 50. Furthermore, the end of the multi-core optical fiber 20 including the slanted end face 24 is inserted together with the ferrule 40 fixed to the end, into the sleeve 50 from the other opening end of the sleeve 50.

In the sleeve 50, both or one of the multi-core optical fibers 10, 20 is rotated so as to increase the contact area between the end face 14 of the multi-core optical fiber 10 and the end face 24 of the multi-core optical fiber 20 (cf. FIG. 2A), thereby implementing interconnection between the end face 14 of the multi-core optical fiber 10 and the end face 24 of the multi-core optical fiber 20. By this operation, the multi-core optical fiber interconnection structure 1 can be obtained while mutual alignment between the positions of the cores 11 in the multi-core optical fiber 10 and the positions of the cores 21 in the multi-core optical fiber 20 to be optically coupled in the one-to-one correspondence relation is achieved (cf. FIG. 2B). Regardless of the condition of the end faces 14, 24 in contact with each other or the condition of the end faces 14, 24 in a partial or total non-contact state with each other, the end face 14 of the multi-core optical fiber 10 and the end face 24 of the second multi-core optical fiber 20 preferably face each other so as to minimize variation in inter-core connection losses of the pairs of cores 11, 21 each in the one-to-one correspondence relation. Specifically, positional deviation amounts between the cores 11 and the cores 21 in the one-to-one correspondence relation are preferably not more than 1.6 μm. Furthermore, the connection losses between the cores 11 and the cores 21 in the one-to-one correspondence relation are preferably not more than 0.4 dB. The end face 14 of the multi-core optical fiber 10 and the end face 24 of the second multi-core optical fiber 20 preferably face each other so as to minimize variation in core pitches of the pairs of cores each in the one-to-one correspondence relation.

Even if there is a small gap between the end face 14 and the end face 24 so that the contact area between the end face 14 of the multi-core optical fiber 10 and the end face 24 of the multi-core optical fiber 20 cannot be maximum, reflection at the interconnection between the multi-core optical fibers 10, 20 will be effectively reduced. In the present embodiment, the end face 14 has a slant of 8° with respect to the plane normal to the central axis AX1, and the end face 24 has a slant of 8° with respect to the plane normal to the central axis AX2. In this case, most of Fresnel reflection due to the refractive index difference between the cores of the multi-core optical fiber and air in the gap does not return to the cores, and typically, the optical return loss of not less than 30 dB can be ensured (leading to reduction in light quantity of back reflection).

In the above description, the multi-core optical fiber interconnection structure 1 (FIG. 2B) is provided with the multi-core optical fibers 10, 20, ferrules 30, 40, and sleeve 50. However, these components may be housed in an appropriate housing, thereby realizing a connector for multi-core optical fibers being suitable for practical use, having a low light quantity of back reflection (i.e., a large optical return loss), and allowing low-loss coupling between the cores.

In the above description, the slant angles of the end faces of the multi-core optical fibers were set at about 8° with respect to the plane normal to the central axis. The optical return loss can be further increased by increasing the slant angles of the end faces. In addition, an increase in the sectional areas of the slanted end faces allows adjustment to increase the contact area between the end faces, so as to improve the accuracy of core alignment. On the other hand, a polishing amount will increase in order to form the end faces with the increased slant angle. Furthermore, it will increase issues in practical use, e.g., increase in a possibility of breakage at the tip ends of the slanted end faces when brought into a butting condition. From these, the angles of the slanted end faces are desirably set in the range of about 8±3° (i.e., in the range of 5° to 11°), from the viewpoint of achieving the properties such as the optical return loss and the practical use together.

Second Embodiment

Figure 3A:
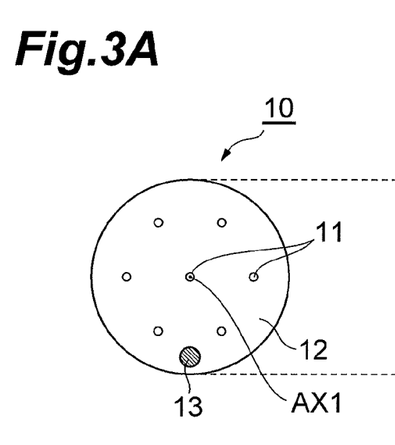
FIGS. 3A and 3B are drawings showing a configuration of one multi-core optical fiber (first multi-core optical fiber) applicable to a multi-core optical fiber interconnection structure according to the second embodiment.
Figure 3B:
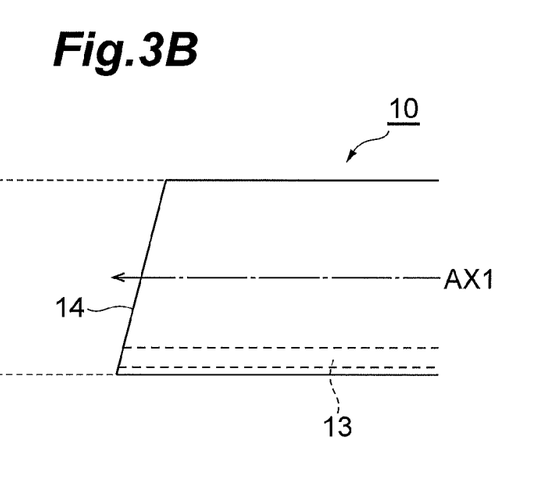

FIGS. 3A and 3B are drawings showing a configuration of one multi-core optical fiber (first multi-core optical fiber) 10 applied to a multi-core optical fiber interconnection structure 2 according to the second embodiment. FIG. 3A is a view of the multi-core optical fiber 10 from a direction along the central axis AX1. FIG. 3B is a view of the multi-core optical fiber 10 from a direction normal to the central axis AX1.

The multi-core optical fiber 10 has a plurality of cores 11 extending along the central axis AX1, in a common cladding 12. Each core 11 has the refractive index higher than that of the cladding 12 and can guide light. In the example shown in FIGS. 3A and 3B, one core 11 exists at the center in a circular section normal to the central axis AX1 of the multi-core optical fiber 10 and six cores 11 exist at equal intervals on the circumference of a circle centered at the central core 11. Namely, the seven cores 11 are arranged at respective grid points of a triangle grid.

The multi-core optical fiber 10 has a marker for discrimination of core arrangement orientations (marker to specify the positions of the respective cores in core arrangement) 13. The marker 13 extends along the central axis AX1. In the example shown in FIGS. 3A and 3B, the marker 13 is arranged in the circular section normal to the central axis AX1 of the multi-core optical fiber 10 so that it is located outside the circle on the circumference of which the six cores 11 exist, and at equidistant positions from two neighboring cores out of the six cores 11. In the present embodiment, the end face 14 of the multi-core optical fiber 10 is slanted relative to the plane normal to the central axis AX1. The slant angle thereof is, for example, 8°.

The multi-core optical fiber 10 of this configuration is manufactured as described below. A coating layer is removed in a fixed range on the one end side of the multi-core optical fiber 10 to expose the cladding 12 and the end face of the multi-core optical fiber 10 is cut slantwise so as to make the end face 14 projecting on the side where the marker 13 exists. Methods of slant-cutting include a method of forming a small notch at a portion that can be a starting point of cutting with a twist being applied to the multi-core optical fiber, a method using a laser beam with controlled irradiation and scan directions, and so on.

Figure 4A:
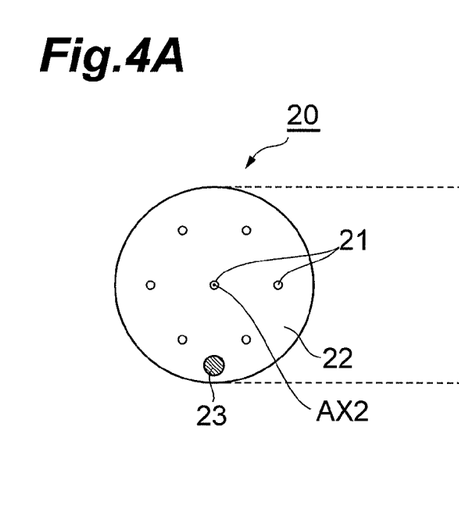
FIGS. 4A and 4B are drawings showing a configuration of the other multi-core optical fiber (second multi-core optical fiber) applicable to the multi-core optical fiber interconnection structure according to the second embodiment.
Figure 4B:
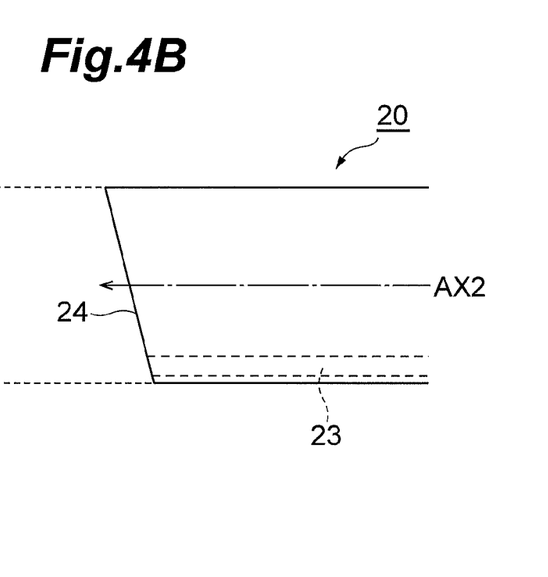

FIGS. 4A and 4B are drawings showing a configuration of the other multi-core optical fiber (second multi-core optical fiber) 20 applied to the multi-core optical fiber interconnection structure 2 according to the second embodiment. FIG. 4A is a view of the multi-core optical fiber 20 from a direction along the central axis AX2. FIG. 4B is a view of the multi-core optical fiber 20 from a direction normal to the central axis AX2. The multi-core optical fiber 20 has much the same configuration as the multi-core optical fiber 10. Namely, the multi-core optical fiber 20 has a plurality of cores 21 and a marker 23 extending along the central axis AX2, in a common cladding 22 and has an end face 24 slanted relative to a plane normal to the central axis AX2.

As seen from comparison between FIGS. 3A and 3B and FIGS. 4A and 4B, the multi-core optical fiber 10 and the multi-core optical fiber 20 have mutually opposite relations between the directions of slants of the respective end faces and between the positions of the markers. Namely, in the multi-core optical fiber 10, the end face 14 projects toward the multi-core optical fiber 20 on the side where the marker 13 exists. On the other hand, in the multi-core optical fiber 20 the end face 24 projects toward the multi-core optical fiber 10 on the side opposite to the side where the marker 23 exists.

Figure 5A:
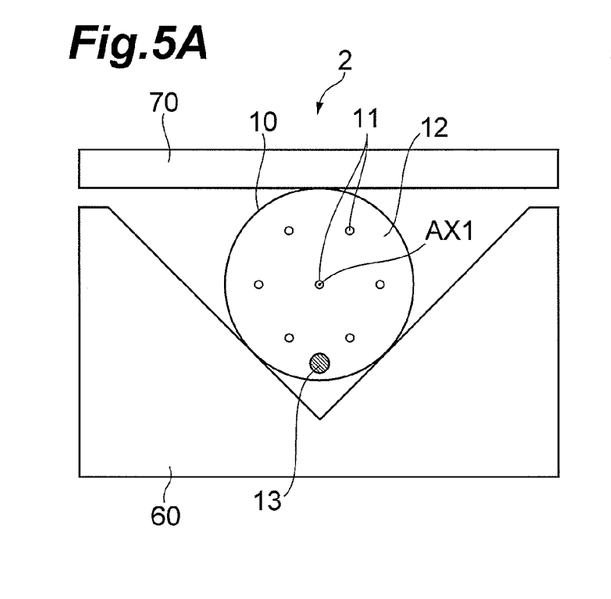
FIGS. 5A and 5B are drawings showing a configuration of the multi-core optical fiber interconnection structure according to the second embodiment.
Figure 5B:
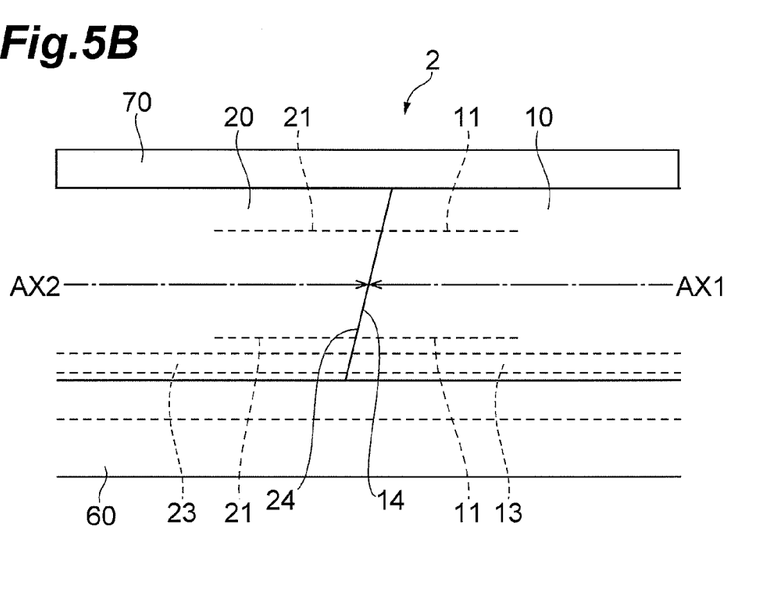

FIGS. 5A and 5B are drawings showing a configuration of the multi-core optical fiber interconnection structure 2 according to the second embodiment. FIG. 5A shows a cross section normal to the central axis AX1 and FIG. 5B a cross section including the central axes AX1, AX2. The multi-core optical fiber interconnection structure 2 is provided with the multi-core optical fiber 10 and the multi-core optical fiber 20 of the above-described structures and also provided with a groove member 60 and a lid member 70.

The groove member 60 has a V-groove to implement positioning of the multi-core optical fiber 10 and the multi-core optical fiber 20. The lid member 70 is placed on the multi-core optical fiber 10 and multi-core optical fiber 20 positioned by the V-groove of the groove member 60, and functions to keep the optical fibers within the V-groove.

In this state, both or one of the multi-core optical fibers 10, 20 is rotated so as to increase the contact area between the end face 14 of the multi-core optical fiber 10 and the end face 24 of the multi-core optical fiber 20, thereby achieving interconnection between the end face 14 of the multi-core optical fiber 10 and the end face 24 of the multi-core optical fiber 20. By this operation, the multi-core optical fiber interconnection structure 2 can be obtained while mutual alignment between the positions of the cores 11 in the multi-core optical fiber 10 and the positions of the cores 21 in the multi-core optical fiber 20 to be optically coupled is achieved and mutual alignment between the position of the marker 13 and the position of the marker 23 is also achieved (cf. FIGS. 5A and 5B).

An adhesive is poured into gaps among the multi-core optical fiber 10, the multi-core optical fiber 20, the V-groove of the groove member 60, and the lid member 70 and this adhesive is cured to fix these components. The multi-core optical fiber interconnection structure 2 is manufactured as described above. The multi-core optical fiber interconnection structure 2 is a structure to implement optical interconnection by mechanical splice between the multi-core optical fiber 10 and the multi-core optical fiber 20.

In the present embodiment as well, even if there is a small gap between the end face 14 and the end face 24 so that the contact area between the end face 14 of the multi-core optical fiber 10 and the end face 24 of the multi-core optical fiber 20 cannot be maximum, reflection will be effectively reduced at the interconnection between the multi-core optical fibers 10, 20. Namely, in the present embodiment, the end face 14 has the slant of 8° relative to the plane normal to the central axis AX1 and the end face 24 has the slant of 8° relative to the plane normal to the central axis AX2. In this case, most of Fresnel reflection due to the refractive index difference between the cores of the multi-core optical fibers and air in the gap does not return to the cores and typically, the optical return loss of not less than 30 dB can be ensured.

Let us consider as the worst case that can occur in the multi-core optical fiber interconnection structure 2, a case where the opposite end faces of the multi-core optical fibers are in contact with each other at one end of the fiber end faces (e.g., at the left end in the direction of lateral arrangement of three cores in FIGS. 3A and 4A) and there is a gap of 20 μm between the opposite end faces of the multi-core optical fibers at the opposite end (e.g., at the right end in the direction of lateral arrangement of three cores in FIGS. 3A and 4A). In this case, supposing the diameter of the claddings of the multi-core optical fibers is 125 μm, an angle of slant between the end faces becomes about 9.1° ($=\tan^{-1}(20/125)$) and the maximum positional deviation in the end face becomes about 1.6 μm ($=125\times(1-\cos(9.1))$). If the mode field diameter in each core of the multi-core mode optical fibers is equivalent to that of a standard single-mode optical fiber, the foregoing positional deviation amount corresponds to the connection loss of about 0.4 dB.

Modification Examples

The present invention does not have to be limited to the above embodiments but can be modified in many ways. For example, the seven cores were arranged in the triangle grid pattern in the first and second embodiments, but the number of cores and the core arrangement in the multi-core optical fibers do not have to be limited to this configuration. The number of cores may be not more than 6 or not less than 8. The core arrangement may be determined from a variety of forms, e.g., arrangement of a rectangular grid pattern, arrangement on the same circumference, and so on.

In the second embodiment, one marker was the one that can be optically recognized on the end face, but the number, form, and arrangement of marker do not have to be limited to this configuration. A variety of modification examples can be contemplated; e.g., two or more markers are arranged so as to facilitate formation of the slant end faces.

The first and second embodiments were the examples to connect the single multi-core optical fibers to each other, but the present invention is also applicable to en bloc connection of multiple multi-core optical fibers. The present invention is not applied only to the interconnection between multi-core optical fibers, but also applied to interconnection between a multi-core optical fiber and another optical component. In this case, it is also expected to achieve the effect of increase in optical return loss of the multi-core optical fiber.

The multi-core optical fiber interconnection structure according to the present invention successfully achieves the reduction of reflection at the interconnection between the multi-core optical fibers.

What is claimed is:

1. A multi-core optical fiber interconnection structure comprising:
   a first multi-core optical fiber having a plurality of first cores extending along a first central axis, a first common cladding covering each of the plurality of first cores, and a first marker provided within the first common cladding while being completely separated from both the first central axis and an outer periphery of the first common cladding, to ensure a rotation of the first multi-core optical fiber in a circumferential direction about the first central axis and to function as an index for cutting end portion of the first multi-core optical fiber slantwise relative to the plane normal to the first central axis;
   a first ferrule attached to the end portion of the first multi-core optical fiber so that end faces of the first ferrule and the first multi-core optical fiber correspond to each other;
   a second multi-core optical fiber having a plurality of second cores extending along a second central axis, a second common cladding covering each of the plurality of second cores, and a second marker provided within the second common cladding while being completely separated from both the second central axis and an outer periphery of the second common cladding, to ensure a rotation of the second multi-core optical fiber in a circumferential direction about the second central axis and to function as an index for cutting end portion of the second multi-core optical fiber slantwise relative to the plane normal to the second central axis; and
   a second ferrule attached to the end portion of the second multi-core optical fiber so that end faces of the second ferrule and the second multi-core optical fiber correspond to each other,
   wherein both the end faces of the first ferrule and the first multi-core optical fiber are coincident with a common plane which slants relative to a plane normal to the first central axis and both the end faces of the second ferrule and the second multi-core optical fiber are coincident with a common plane which slants relative to a plane normal to the second central axis,
   wherein the first and second multi-core optical fibers are arranged so that the plurality of first cores and the plurality of second cores are optically coupled in a one-to-one correspondence relation where the slanted end faces of the first ferrule and the first multi-core optical fiber directly face the slanted end faces of the second ferrule and the second multi-core optical fiber in a state in which the first central axis and the second central axis are on a same straight line, and
   wherein the slanted end faces of the first ferrule and the first multi-core optical fiber face the slanted end faces of the second ferrule and the second multi-core optical fiber so as to minimize variation in core pitches of pairs of the first and second cores each in the one-to-one correspondence relation, each of the core pitches being defined along the first and second central axes.

2. The multi-core optical fiber interconnection structure according to claim 1, wherein the slanted end face of the first multi-core optical fiber and the slanted end face of the second multi-core optical fiber face each other so as to minimize variation in inter-core connection losses of pairs of the first and second cores each in the one-to-one correspondence relation.

3. The multi-core optical fiber interconnection structure according to claim 1, wherein the slanted end face of the first multi-core optical fiber is slanted in the range of 5° to 11° relative to the plane normal to the first central axis and wherein the slanted end face of the second multi-core optical fiber is slanted in the range of 5° to 11° relative to the plane normal to the second central axis.

4. The multi-core optical fiber interconnection structure according to claim 1,
   wherein the first marker in the slanted end face of the first multi-core optical fiber is located in an end face region lying farther away from the other end face of the first multi-core optical fiber than a first reference plane including an intersection between the slanted end face of the first multi-core optical fiber and the first central axis and being normal to the first central axis, and
   wherein the second marker in the slanted end face of the second multi-core optical fiber is located in an end face region lying nearer to the other end face of the second multi-core optical fiber than a second reference plane including an intersection between the slanted end face of the second multi-core optical fiber and the second central axis and being normal to the second central axis.

5. The multi-core optical fiber interconnection structure according to claim 1, further comprising
   a sleeve for positioning of the first ferrule and the second ferrule, the sleeve having a first opening inserted with at least a tip portion of the first ferrule attached to the end portion of the first multi-core optical fiber, a second opening inserted with at least a tip portion of the second ferrule attached to the end portion of the second multi-core optical fiber, and an inner wall restricting a movement of the first ferrule in a direction perpendicular to the first central axis and a movement of the second ferrule in a direction perpendicular to the second central axis.

6. The multi-core optical fiber interconnection structure according to claim 1, further comprising: a groove member for positioning of the first multi-core optical fiber and the second multi-core optical fiber.

7. The multi-core optical fiber interconnection structure according to claim 1, wherein an optical return loss of light on the slanted end face of the first multi-core optical fiber is not less than 30 dB, and an optical return loss of light on the slanted end face of the second multi-core optical fiber is not less than 30 dB.

8. The multi-core optical fiber interconnection structure according to claim 1, wherein positional deviation amounts between the first cores and the second cores in the one-to-one correspondence relation are not more than 1.6 μm.

9. The multi-core optical fiber interconnection structure according to claim 1, wherein connection losses between the first cores and the second cores in the one-to-one correspondence relation are not more than 0.4 dB.

10. The multi-core optical fiber interconnection structure according to claim 1, wherein at least a portion of the slanted end face of the first multi-core optical fiber is in contact with the slanted end face of the second multi-core optical fiber.

11. A method for manufacturing a multi-core optical fiber interconnection structure comprising:
    a first multi-core optical fiber at least one end face of which is slanted relative to a plane normal to a first central axis and which has a plurality of first cores extending along the first central axis, a first common cladding covering the plurality of the first cores, and a first marker provided within the first common cladding while being completely separated from both the first central axis and an outer periphery of the first common cladding, to ensure a rotation of the first multi-core optical fiber in a circumferential direction about the first central axis and function as an index for cutting end portion of the first multi-core optical fiber; and a second multi-core optical fiber at least one end face of which is slanted relative to a plane normal to a second central axis and which has a plurality of second cores extending along the second central axis, a second common cladding covering the plurality of second cores, and a second marker provided within the second common cladding while being completely separated from both the second central axis and an outer periphery of the second common cladding, to ensure a rotation of the second multi-core optical fiber in a circumferential direction about the second central axis and function as an index for cutting end portion of the second multi-core optical fiber, the method comprising the steps of:

cutting the end portion of the first multi-core optical fiber slantwise relative to the plane normal to the first central axis so as to make the first marker exist in a side or an opposite side where the slanted end face of the first multi-core optical fiber projects, and cutting the end portion of the second multi-core optical fiber slantwise relative to the plane normal to the second central axis so as to make the second marker exist in a side or an opposite side where the slanted end face of the second multi-core optical fiber projects, arranging the first and second multi-core optical fibers so that the slanted end face of the first multi-core optical fiber and the slanted end face of the second multi-core optical fiber directly face each other in a state in which the first central axis and the second central axis are on a same straight line; and adjusting relative positions between the slanted end faces of the first and second multi-core optical fibers so as to minimize variation in inter-core connection losses of pairs of the first and second cores each in the one-to-one correspondence relation, in a state in which the first cores and the second cores are each in the one-to-one correspondence relation.

12. The method according to claim 11, wherein at least a portion of the slanted end face of the first multi-core optical fiber is in contact with the slanted end face of the second multi-core optical fiber.

13. The method according to claim 11, wherein the adjusting including:

moving at least the first multi-core optical fiber toward the second multi-core optical fiber to reduce an interval between the one end face of the first multi-core optical fiber and the one end face of the second multi-core optical fiber; and rotating at least the first multi-core optical fiber in a circumferential direction about the first central axis.

14. A multi-core optical fiber interconnection structure comprising:

a first multi-core optical fiber having a plurality of first cores extending along a first central axis, a first common cladding covering the plurality of first cores, and a first marker provided within the first common cladding while being completely separated from both the first central axis and an outer periphery of the first common cladding, to ensure a rotation of the first multi-core optical fiber in a circumferential direction about the first central axis and to function as an index for cutting end portion of the first multi-core optical fiber slantwise relative to the plane normal to the first central axis;

a first ferrule attached to the end portion of the first multi-core optical fiber so that end faces of the first ferrule and the first multi-core optical fiber correspond to each other;

a second multi-core optical fiber having a plurality of second cores extending along a second central axis, a second common cladding covering the plurality of second cores, and a second marker provided within the second common cladding while being completely separated from both the second central axis and an outer periphery of the second common cladding, to ensure a rotation of the second multi-core optical fiber in a circumferential direction about the second central axis and to function as an index for cutting end portion of the second multi-core optical fiber slantwise relative to the plane normal to the second central axis; and a second ferrule attached to the end portion of the second multi-core optical fiber so that end faces of the second ferrule and the second multi-core optical fiber correspond to each other;

wherein both the end faces of the first ferrule and the first multi-core optical fiber are coincident with a common plane which slants relative to a plane normal to the first central axis and both the end faces of the second ferrule and the second multi-core optical fiber are coincident with a common plane which slants relative to a plane normal to the second central axis, wherein the first and second multi-core optical fibers are arranged so that the plurality of first cores and the plurality of second cores are optically coupled in a one-to-one correspondence relation where the slanted end faces of the first ferrule and the first multi-core optical fiber directly face the slanted end faces of the second ferrule and the second multi-core optical fiber in a state in which the first central axis and the second central axis are on a same straight line.

15. The multi-core optical fiber interconnection structure according to claim 14, wherein the slanted end face of the first multi-core optical fiber is slanted in the range of 5° to 11° relative to the plane normal to the first central axis and wherein the slanted end face of the second multi-core optical fiber is slanted in the range of 5° to 11° relative to the plane normal to the second central axis.

* * * * *